Dec. 19, 1933.  G. W. WACKER ET. AL  1,939,933

CONDENSER GANG DRIVE

Filed Oct. 6, 1930

INVENTOR.
BY
ATTORNEYS

Patented Dec. 19, 1933

1,939,933

UNITED STATES PATENT OFFICE 1,939,933

CONDENSER GANG DRIVE

George W. Wacker and Ralph H. Langley, Cincinnati, Ohio, assignors to The Crosley Radio Corporation, Cincinnati, Ohio, a corporation of Ohio Application October 6, 1930. Serial No. 486,721

5 Claims. (Cl. 74—7)

Our invention relates to mechanisms for driving the condenser gangs of a radio set, and more particularly a drive which is suitable for an automobile radio set where the condenser gang will often have to be remote from the operating handle for its driving mechanism, and where, in addition, the drive will have to withstand shocks and jars without shifting, and in which the elimination of back lash is important.

It will be apparent that the operation of a radio receiver in which the condenser gang might shift about slightly would be impractical in an automobile or other vehicle.

It will be among our objects to prevent over rotation of the condenser gang, to provide against breakage or twisting of the condenser gang shaft by means of the adjusting mechanism, and further to take all strain from the driving cord except its necessary driving strain. According to our invention we accordingly provide a drive which has a high revolution ratio to the condenser gang shaft, and we provide a stop for the condenser gang which limits its movement, which stop is a part of the driving mechanism and is suitably adjustable so as not to place unnecessary strain on the drive rope and condenser. We further provide a drive in which there is no looseness whatever, and which can be set in various locations with reference to the condenser gang shaft, thereby accommodating different types of automobiles.

Specifically, we provide for a rope or cable drive for a condenser gang, using a threaded shaft as winch member, in the threads of which the cable is laid and secured. We provide a sheave for the cable, which sheave can be placed on either end of the condenser gang shaft and a bracket which holds the cable guiding pulleys, said bracket being conveniently placed on the condenser gang frame, thereby directing the cable from the winch to the sheave. The winch is a unit in itself with a simple stamping as a frame, and includes an adjustable stop which is positive and simple.

In the following specification we will describe the preferred embodiment of our improvement, as illustrative of the invention which will be set forth in the appended claims.

In the drawing:—

Figure 1:
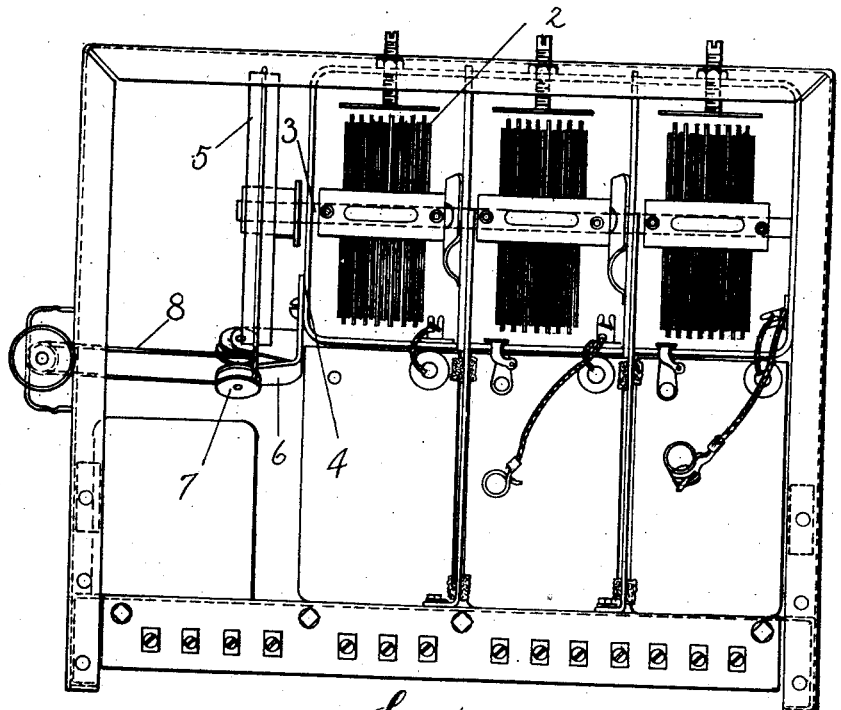
Figure 1 is a side elevation of an automobile radio receiver with the front cover plate removed.
Figures 2, 3, 4:
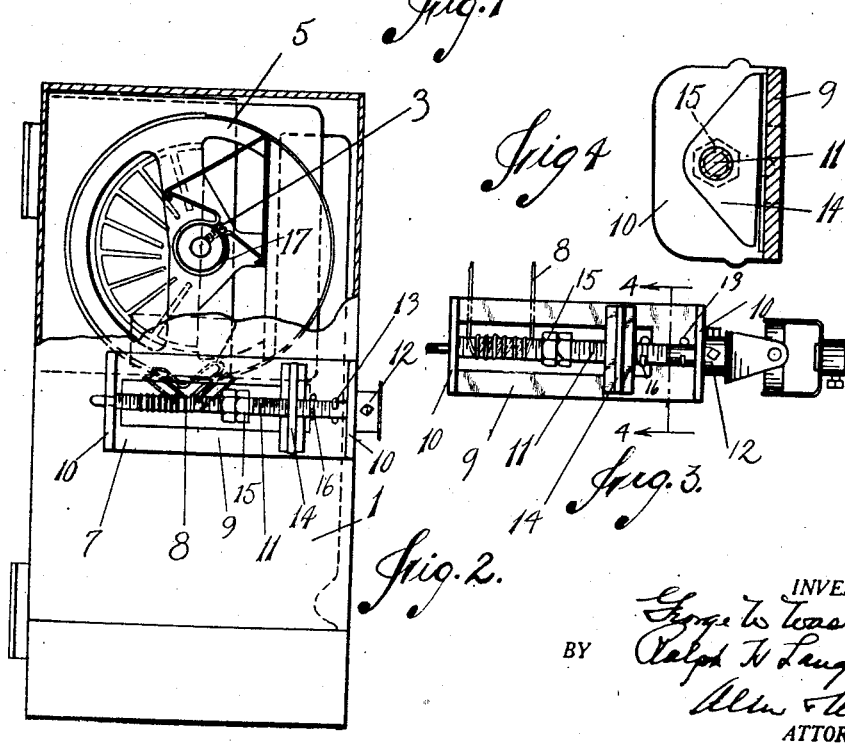
Figure 2 is an end elevation of the same.
Figure 3 is a detail elevation of the winch.
Figure 4 is an enlarged section on the line 4, 4 of Figure 3, showing the stop device.

The cabinet or frame of the receiver is indicated generally at 1. Within this frame is mounted a condenser gang indicated generally at 2 and having a rotor shaft 3. This shaft is projected from the frame parts 4 in which the condenser is housed and has mounted on one of its projecting ends a sheave 5. This sheave is of substantial diameter.

Mounted on the side of the frame part 4 where the shaft projects is a bracket 6, on which are mounted a pair of small pulleys 7, said pulleys serving to guide the driving cable 8 onto and away from the sheave 5.

The winch is provided with a mounting member or base which is a stamping having a base 9, and two upstanding ears 10, suitably apertured to serve as journals for the cable shaft. The shaft 11 is thrust through the ears, and held in place by a driving collar 12 on one side and a cotter pin 13 on the other side of the forward one of the two ears.

The shaft 11 is threaded, and has secured thereon, and lying within the threads so as to be well guided and held, the cable 8. The cable may be soldered to the shaft and given several wraps around the shaft in each direction, whence it is passed over the guide pulleys and sheave, and the ends may be secured to a spring member 17 to maintain the cable under proper tension and accommodate any stretching or shrinkage which might occur.

It will be noted that the cable, when arranged around the several parts as noted, will drive the condenser shaft when the winch shaft 11 is revolved, without any play or looseness. Furthermore, the driving ratio between the winch shaft and the condenser shaft sheave will be large. Such a drive as described will not back away from position but locks automatically, as does a worm wheel drive, but that as compared to a worm wheel feed of the type which would be practical in such a construction as is here involved, is very much freer of any play.

It is of advantage also to have this high ratio because it is usually necessary to use a long rod for driving the winch shaft collar 12, and such a long rod would permit play in the condenser shaft if some self-locking drive were not placed between it and the shaft.

As a stop mechanism, we mount on the threaded portion of the shaft 11, a triangular shaped follower 14 which is threaded to engage the threads of the shaft, and the wide base of which contacts with the base of the mounting piece so that it cannot revolve. As the winch shaft is revolved this follower moves in one direction or another until it strikes some stop on the winch shaft, when it will prevent further movement of the said shaft. We have shown a pair of nuts 15 on the shaft which constitute an adjustable stop, and a cotter pin 16 which constitutes the other stop. This is the arrangement usually employed, since the shaft can set in place with the follower against the cotter pin, and the cable adjusted so that the condenser gang is in one terminal position, and the nuts then adjusted to serve as the stop in the opposite position.

It will be apparent that the winch with its stop and frame can be a standard part and located at one end or the other of a receiver box, as can the guide pulley bracket. The condenser shaft can be equipped with the driving sheave at either end, when so designed.

Having thus described our invention, what we claim as new and desire to secure by Letters Patent, is:—

1. A condenser drive comprising a large sheave on the condenser shaft, a driving shaft of relatively small diameter, a cable secured upon and wrapped around the driving shaft, means for guiding the cable around the sheave, means for operating the driving shaft, said driving shaft being threaded with one continuous thread, and the cable wrapped so as to lie in the thread of the driving shaft, a follower threaded on said driving shaft, stops on said driving shaft for said follower, one of said stops being adjustable on said driving shaft, and means for preventing the rotation of said follower, said follower and said adjustable stop being threaded on respective sections of the same thread, different from that section upon which the cable is wrapped.

2. A condenser drive comprising a large sheave on the condenser shaft, a driving shaft of relatively small diameter, a cable secured upon and wrapped around the driving shaft, means for guiding the cable around the sheave, means for operating the driving shaft, said driving shaft being threaded with one continuous thread and the cable wrapped so as to lie in the thread of the driving shaft, a follower threaded on a different porton of the same thread on the driving shaft, said driving shaft having stops thereon for the follower, and means for preventing rotation of the follower.

3. A driving winch for a gang condenser shaft comprising a mounting piece having a base and supporting ears, a shaft threaded with one continuous thread mounted in said ears, a cable about said shaft lying in the thread thereon and secured thereto, and a follower threaded on a different portion of the same thread on the said shaft having a portion which engages the base to prevent its turning and stops for the follower on said shaft.

4. A driving winch for a gang condenser shaft comprising a mounting piece having a base and supporting ears, a shaft threaded with one continuous thread mounted in said ears, a cable about said shaft lying in the thread thereon and secured thereto, and a follower threaded on a different portion of the same thread on the said shaft having a portion which engages the base to prevent its turning, and stops for the follower, one of said stops formed of a pair of units threaded on another different portion of the same thread on the shaft.

5. A drive for gang condenser shafts comprising a sheave on the condenser shaft, a bracket having guide pulleys thereon, a separate mounting piece having a winch shaft therein and located at a distance from said bracket, said shaft being threaded, a cable having a continuous portion wound about said shaft and lying in the threads thereon and passing over the said pulleys and said sheave under continuous tension, a follower threaded on the winch shaft, and stops for the follower on said winch shaft, at least one of which is adjustable, said stops defining a movement space for said follower, removed from the space in which said cable contacts said shaft.

GEORGE W. WACKER.
RALPH H. LANGLEY.